Nov. 5, 1968   L. E. ROOT ET AL   3,409,338

THRUST BEARING

Filed Nov. 14, 1966

INVENTORS.
LAWRENCE E. ROOT.
BY WILLIAM F. PETERS.

John R. Varney
ATTORNEY.

United States Patent Office 3,409,338
Patented Nov. 5, 1968

3,409,338
THRUST BEARING
Lawrence E. Root, Syracuse, and William F. Peters, Phoenix, N.Y., assignors to Rollway Bearing Company, Inc., Syracuse, N.Y., a corporation of New York
Filed Nov. 14, 1966, Ser. No. 593,997
1 Claim. (Cl. 308—231)

This invention has as an object and relates to a new and improved thrust bearing. It is a more specific object of this invention to provide a new and improved thrust bearing having uniform load distribution characteristics.

In applications where very high thrust loads are to be transmitted through thrust bearings as, for example, in steel rolling mills, it is critical for the thrust bearing to receive and transmit the thrust load evenly in order for the bearing to have a relatively long, useful life. In such applications, however, it is impossible within normal manufacturing tolerances for the bearing seat to be formed perfectly flat so that the center line of the thrust bearing, when inserted in such an uneven bearing seat, is normally askew with the center line of the motor-operated screw which applies the thrust to the bearing. Alternately, even when the center lines are coincident, an uneven loading can exist.

Accordingly, it is a more specific object of this invention to provide compensating means to compensate for the bearing seat unevenness in order to align the center line of the thrust load to be transmitted through the bearing.

An additional problem in connection with such rolling mill thrust bearings is the occurrence of high shock loads. These are caused by "cobbles" in the sheet of steel being fed through the rolling mills. "Cobbles" are areas in the sheet steel of significantly greater cross-sectional thickness than the sheet and when they strike the rollers cause tremendous shock loads to be transmitted to the thrust bearing. These shock loads may cause bearing failure because they instantaneously overload the bearing.

It is, therefore, a further object of this invention to provide a thrust bearing assembly of a new and improved design including a cantilevered plate or race and a load transmitting ring, which act conjunctively to transmit high instantaneous loads through the bearing so as to prevent bearing failure.

The invention consists in the normal features and constructions and the method hereinafter set forth and claimed.

In describing the invention, reference is had to the accompanying drawing in which like characters designate corresponding parts in all the views.

In the drawing—

Figure 1:
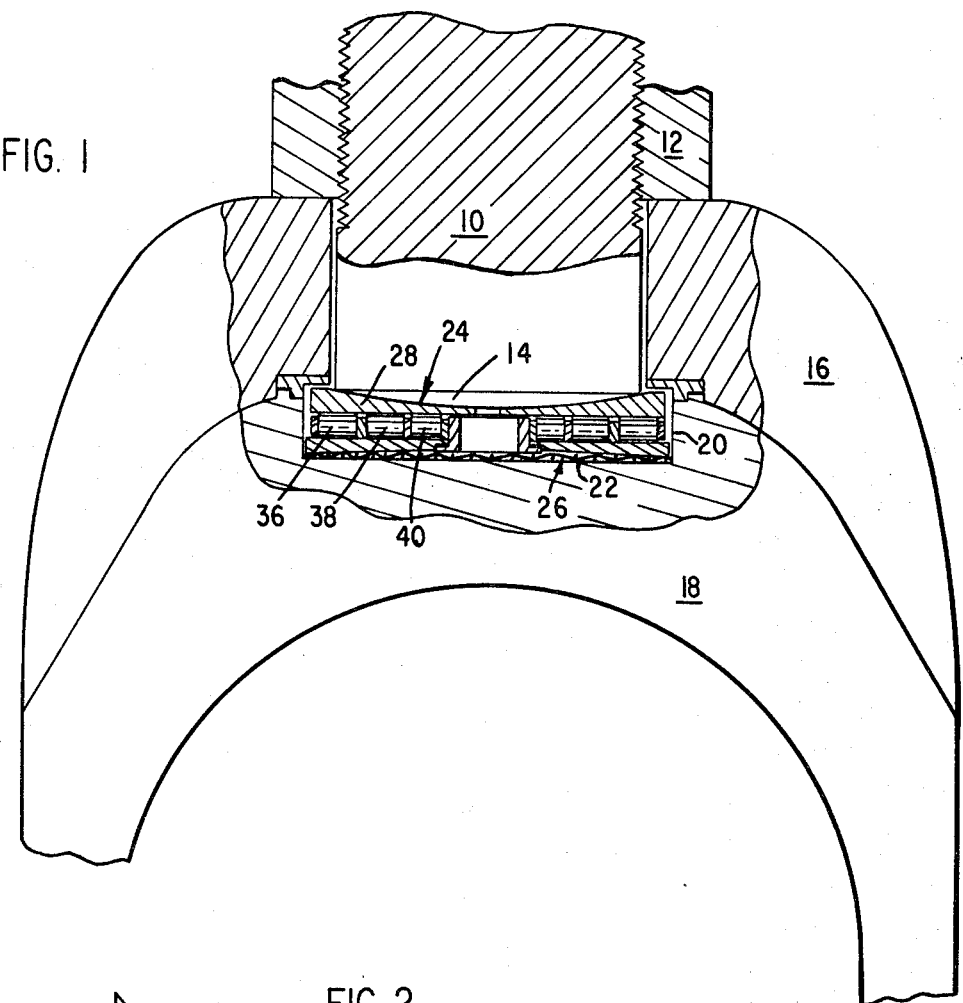
FIGURE 1 is a cross-section of a schematic elevational view of a typical high load thrust bearing application.

In FIGURE 1 the thrust bearing comprising the preferred embodiment of the invention has been shown as utilized in a steel rolling mill. In that figure the motor operated mill screw is shown at 10 and is guided by a threaded block 12. The lower end of the screw 10 is formed with a convex surface 14 for a purpose to be hereinafter described. The screw 10 and guide block 12 are carried by a frame 16 which is received on the back-up roll frame or yoke 18 all as is conventional in steel rolling mills.

The frame 18 is undercut as at 20 to form a bearing seat 22.

The bearing seat 22, because of general machining practices and normal or allowable tolerances is formed unevenly. That is to say, when inserted in the seat 22, the center line of the bearing at 24 will be askew with the center line of the thrust screw 10. This will cause the load applied by the screw 10 to be asserted unevenly to the bearing thus causing bearing failure prematurely. This in turn necessitates the shut down of the rolling mill while the bearing is replaced, thus causing added increase in the manufacture of the steel because of the lost time involved.

To compensate for this unevenness, applicants have devised an arrangement whereby regardless of the amount or the extent of the bearing seat unevenness, the thrust bearing will be formed in a manner so as to make its center line coincident with the center line of the thrust screw. This arrangement comprises the use of a mesh element 26 on the underside of the bottom race of the thrust bearing. The diameter of the strands used in making up the mesh and the interstices in the mesh are predetermined and are related to the diameter of the seat and the amount of load to be applied by the thrust screw so as to permit compression and deformation of the strands of the mesh in the so-called "high" portions of the bearing seat, the greatest deformation taking place at the highest portion of the seat and lesser deformation taking place at the less high portions of the bearing seat. This compensation for the unevenness of the bearing seat is maintained to insure a uniform roller loading when the bearing is subjected to thrust loads. The uniform roller loading is in turn desirable to prevent selective roller failure which occurs when the bearing is unevenly loaded. Where the rollers are evenly loaded, the bearing will operate under thrust loads for its maximum design life.

Figure 2:
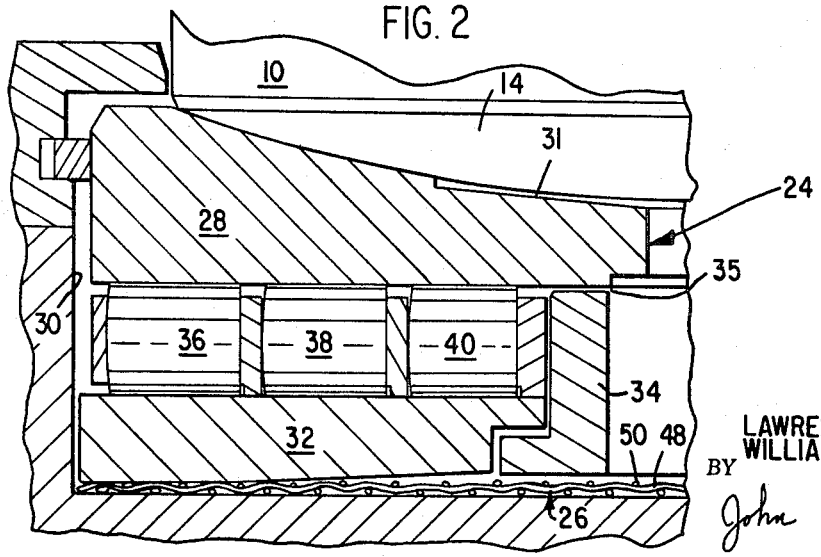
FIGURE 2 is a fragmentary cross-sectional view of a detail of FIGURE 1.

Referring to FIGURE 2, the thrust bearing is formed of an upper race 28 which has its upper surface formed on a spherical radius complementary to the radius of the convex formed on the abutting face of the thrust screw 10. This also helps to center the bearing 24 in the bearing seat 22 and, as shown in an exaggerated manner in FIGURE 2, there is adequate clearance between the periphery of the upper race 28 and the interior wall 30 of the bearing seat. The upper race 28 of the bearing is also relieved as at 31 to achieve uniform loading of the upper race.

The lower race 32 of the bearing is formed in cantilever fashion and as will be seen in FIGURE 2, this is accomplished by reducing the thickness of the race toward the center thereof so that there is a predetermined gap between the under side of the lower race and the compensating mesh 26. As will be obvious, this cantilevered effect or reduced thickness of the race is achieved by forming the lower surface of the race 32 in sloping fashion.

The low race 32 is cantilevered to correct for an uneven application of the load applied to the bearing by poor osculation of the thrust screw so as to permit the plate to deflect under high transient loads to the bearing. The effect of cantilevering this lower race is to give the bearing additional capacity to compensate for such osculation and to increase the shock load capacity which the bearing will take without permanently deforming the bearing roller elements or otherwise damaging the bearing. That is to say that if the initial load upon insertion of the bearing in the bearing seat is applied to the inner or central portion of the bearing the lower race will initially deflect to uniformly distribute the load appled to the bearing. This deflection of the lower race may, under certain loading conditions, continue until the lower race becomes completely deflected and comes into intimate engagement with the mesh element 26.

Any additional transient load such as an instantaneous shock load caused by "cobbles," as above set forth, will cause additional elastic deformation of the roller complements, and will in turn cause the upper race 28 to approach the ring member 34 as the compression of the bearing members closes the gap 35. Upon complete closing of the gap 35, the ring 34 will receive and transmit a portion of the load through the bearing as will be hereinafter described. Such additional transient loads, which are instantaneous in nature, will cause compression of the ring member 34 after contact has been established between the race 28 and the ring member 34. The spring rate of the ring member in comparison with the spring rate of the roller complements is predetermined so that the majority of the excess load will be transmitted through the ring member with the remaining small portion of the excess load being transmitted through the roller complements.

The ring member 34 carried on the inner periphery of the lower race 32 and positioned a spaced predetermined distance or gap 35 from the under surface of the upper race 28. The ring member 34 is formed of a hardened material and acts with the cantilever lower race 32 as set forth above to transmit the high instantaneous shock loads through the bearing as above set forth. When the shock load is transmitted to the bearing by the rolling mill, anti-friction roller members 36, 38 and 40 are elastically deformed so that the load passing through the bearing is divided between two paths. The first path is from bearing seat 22 through the race 32 to the race 28 through the rollers 36, 38 and 40. A second path is created by the elastic deformation of the rollers and is from the bearing seat 22 to the race 28 through the ring member 34, which comes into contact with the upper race 28 upon deformation of the rollers 36, 38 and 40. As will be understood, the amount of the gap 35 is calculated in the manufacturing process so as to cause the ring 34 to engage the race 28 prior to the time when the rollers 36, 38 and 40 are to be permanently deformed.

The outer complement of rollers 36 is greater in number and in axial length than the middle complement of rollers 38, which is also greater in number and in length than the innermost complement of rollers 40. This also is to enable the bearing to transmit maximum loads. The compensating mesh member is made up of a plurality of strands 48 which extend in a first direction and a second group of strands 50 which extend in a direction crosswise to strands 48 and are interwoven therewith. It will be understood that the size of the interstices, wire diameter and material of the mesh may be varied in its construction and in the heat treating given thereto in order to compensate for varying diameters and loads applied to the bearing.

As previously pointed out, the diameter of the strands and the number of interstices in the mesh are predetermined according to the diameter of the bearing and the load to be applied. As an example, where the thrust bearing assembly has an outer diameter of nineteen inches and has a static capacity of 4,265,000 pounds, the mesh is formed of 4 x 4 wire screen having strands of a #12 or a .1055 diameter wire. The total thickness of the mesh is .270 inch or less. The number of rollers 36 in the outer roller complement comprises twenty-four each having a diameter of 1.75 inches and being 2.125 inches long. The middle complement of rollers 38 comprise sixteen rollers each having a diameter of 1.75 inches and length of 1.75 inches.

A bearing of this size and with these dimensions has a weight of approximately 435 pounds.

The thrust bearing compensation of the type hereinafter set forth is used in practicing the method of this invention. This method comprises, briefly, inserting the bearing and a wire mesh element having a known strand diameter and number of interstices per square inch into a bearing seat where the thrust load to be applied is unknown; the thrust load is then applied to the bearing after which the bearing and mesh element is measured; the measured amount of deformation is then plotted on a graph of known loads against deformation for mesh of the same type in order to determine the amount of load which caused the measured deformation. The practice of this method therefore enables the amount of thrust loads to be accurately determined which, in turn, enables users to utilize thrust bearings of the type disclosed of sufficient size and capacity which compensate for misaligned bearing seats and high shock loads, thereby insuring maximum useful life of the thrust bearing.

What we claim is:

1. A thrust bearing comprising an upper race and a lower race with a plurality of anti-friction roller complements located therebetween, the roller engaging faces of said races being parallel, each of said roller complements comprising a plurality of individual roller elements of a pre-selected number and axial length arranged in circumferential rows about the center of said bearing, each successive row of roller elements having a greater number of roller elements than the preceding row, the diameter of roller elements in each of said rows being the same, means to retain said rows of roller complements between the engaging faces of said upper and lower faces, said upper race having its upper surface formed complementary to the surface of a thrust element, an inner portion of said lower race being cantilevered on its under surface to deflect under thrust loads applied to said bearing, a ring element positioned in the center portion of said lower race and being spaced a predetermined distance from the roller engaging face of said upper race, said ring element engaging said upper race upon deflection of the upper race under a thrust load to form a separate load transmission path through said bearing, said deflection of said upper race to engage said ring providing said bearing with an overload capacity and a seat misalignment compensating element positioned beneath the under surface of the lower race in the bearing seat, said element being of a material formed with a plurality of interstices whereby said element deforms upon application of a thrust load to the bearing to compensate for seat misalignment to insure uniform loading of said bearing.

References Cited

UNITED STATES PATENTS

| | | | |
|---|---|---|---|
| 1,956,648 | 5/1934 | Messinger | 308—231 |
| 2,959,458 | 11/1960 | Kaye | 308—231 |

MARTIN P. SCHWADRON, *Primary Examiner.*

CARROLL B. DORITY, *Assistant Examiner.*